United States Patent Office 3,776,985

Patented Dec. 4, 1973

3,776,985

CONTINUOUS PRODUCTION OF PRIMARY AND SECONDARY PHOSPHATE ESTER ADMIXTURE

Louis J. Nehmsmann, Warren, and Leslie M. Schenck, Mountainside, N.J., assignor to GAF Corporation, New York, N.Y.

No Drawing. Filed May 26, 1971, Ser. No. 147,221
Int. Cl. C07f 9/02
U.S. Cl. 260—980 7 Claims

ABSTRACT OF THE DISCLOSURE

This invention relates to the production of surface active compositions, and more particularly to an improved process for continuously preparing surface active compositions containing uniform mixtures of primary and secondary phosphate esters of organic hydroxyl compounds.

Organic hydroxyl compounds have been previously esterified with a number of different phosphating agents including phosphoric acid, $P_2O_5$, $PCl_3$ and $POCl_3$ and the like. While such processes have in some instances produced surface active compounds or compositions, they have been commonly subject to a number of procedural disadvantages and/or have failed to produce a surface active product having optimum properties for certain end uses. Thus, the use of $POCl_3$ as the phosphating agent yields products containing bound chlorine atoms, and in addition requires careful manipulation to remove the HCl produced during the reaction. Further, the HCl raises problems of corrosion. The use of phosphoric acid or solutions of $P_2O_5$ in phosphoric acid as phosphating agent generally yields inconsistent mixtures of different types of esters, including esters of pyrophosphoric acid, phosphoric acid, primary, secondary and tertiary phosphates, and the like. This is considered unacceptable as the desired end products are the primary and secondary esters.

Formerly, it was regarded as necessary when $P_2O_5$ was used as the phosphation reagent to employ large molar ratios of the organic hydroxyl compound in order to bring $P_2O_5$ solids into solution. Advances have been made in the art as exemplified by the Nunn et al. and Nunn patents U.S. 3,004,056 and 3,004,057 respectively, both assigned to the same assignee as herein. While some of the disadvantages of the prior art such as poor color of end product, have been eliminated at least in part by the two aforementioned patents which relate to batch operations, other disadvantages have not.

It is an object therefore of this invention to provide a mixture of primary and secondary phosphate esters which has highly desirable surface active properties by a continuous manufacturing process.

Another object of this invention is to provide a method of making a phosphate ester mixture with acceptable color characteristic without the requirement of using large excesses of the organic hydroxyl compound.

A further objective is to provide a method of making the ester mixture which gives rise to improved product uniformity.

A still further object is to provide a method of making the desired mixture which minimizes the capital investment required for volume production.

These as well as other objects are accomplished by the present invention which provides a process for preparing a substantially uniform mixture of primary and secondary phosphate esters by the continuous reaction of from about 1 to about 4 moles $P_2O_5$ (phosphorous pentoxide) with from about 1 to about 4 moles of an organic hydroxyl compound at substantially constant temperature and under substantially anhydrous conditions. The term "organic hydroxyl compound" is intended to include those non-ionic surface active agents that bear at least one hydroxyl group capable of reacting with $P_2O_5$ to form a phosphate ester.

Briefly stated, the non-ionic surface active agents employed as reactants in the present invention are well known in the art and are disclosed along with suitable methods for their preparation in numerous patents and other publications. An extensive description of the many different types of non-ionic surface active agents which can be employed in the present invention can be found in the Nunn et al patent, U.S. 3,004,056, the disclosure of which is incorporated herein by reference.

In general, the non-ionic surface active agents can be obtained by condensing a polyglycol ether containing the required number of alkenoxy groups or an alkylene oxide such as propylene oxide, butylene oxide, or preferably ethylene oxide, with an organic compound containing at least 5 carbon atoms and a reactive hydrogen atom. As such compounds containing a reactive hydrogen atom there may be mentioned alcohols, phenols, thiols, primary and secondary amines, and carboxylic and sulfonic acids, and their amides. The amount of alkylene oxide or equivalent condensed with the reactive chain, will depend primarily upon the particular compound with which it is condensed. As a convenient rule of thumb, an amount of alkylene oxide or equivalent should be employed which will result in a condensation product containing about 20 to 85% by weight of combined alkylene oxide. However, the optimum amount of alkylene oxide for attainment of the desired hydrophobic-hydrophilic balance may be readily determined in any particular case by preliminary test and routine experimentation.

In general, the nonionic surface active agents having the molecular configuration of a condensation product of at least one mole of an alkylene oxide, preferably ethylene oxide, with one mole of a compound containing at least 5 carbon atoms and a reactive hydrogen atom are preferably polyoxyalkylene derivatives of alkylated and polyalkylated phenols, multi-branched chain primary aliphatic alcohols having the molecular configuration of an alcohol produced by the Oxo process from a polyolefin of at least 7 carbon atoms, and straight chain aliphatic alcohols of at least 10 carbon atoms. Examples of these derivatives and other suitable nonionic surface active agents which may be phosphated in accordance with the present invention are included below. In this list, "E.O." means "ethylene oxide" and the number preceding same refers to the number of moles thereof reacted with one mole of the given reactive hydrogen-containing compound.

Nonylphenol+9—11 E.O.
Nonylphenol+2 E.O.
Dinonylphenol+7 E.O.
Dodecylphenol+18 E.O.
Castor oil+20 E.O.
Tall oil +18 E.O.
Oleyl alcohol+20 E.O.
Amyl alcohol+1 E.O.
Lauryl alcohol+4 E.O.
Hexadecyl alcohol+12 E.O.
Hexadecyl alcohol+20 E.O.
Octadecyl alcohol+20 E.O.
Oxo tridecyl alcohol:
  (From tetrapropylene)+7 E.O.
  (From tetrapropylene)+10 E.O.
  (From tetrapropylene)+15 E.O.
Dodecyl mercaptan+9 E.O.
Soya bean oil amine+10 E.O.
Rosin amine+32 E.O.
Coconut fatty acid amine+7 E.O.
Cocoa fatty acid+10 E.O.

Dodecylbenzene sulfonamide+10 E.O.
Decyl sulfonamide+6 E.O.
Oleic acid+5 E.O.
Polypropylene glycol (30 oxypropylene units)+10 E.O.

The term "organic hydroxyl compound" is also intended to include compounds which do not have the usual hydrophobic-hydrophilic balance generally attributed to nonionic surfactants. Such compounds may be aromatic such as phenol and naphthol, alicyclic such as cyclohexanol and cyclooctanol, and/or aliphatic which may be straight or branched, natural or synthetic, saturated or unsaturated such as methanol, octadecanol, oxotridecyl alcohol, allyl alcohol, oleyl alcohol, methyl Cellosolve, gamma-methoxy butanol, methyl-hydroxyethyl sulfide, and the like.

The $P_2O_5$ can be employed in dry, solid form as a granular powder or other finely divided or particulate form, for reaction with the organic hydroxyl compound. However, if desired, the $P_2O_5$ may first be dispersed in an inert organic diluent such as benzene, xylene, ether, pentane, or low and high boiling hydrocarbon fractions.

In carrying out the continuous phosphation process of this invention, the $P_2O_5$, in either solid or liquid form and the organic hydroxyl compound in fluid, preferably liquid form, are simultaneously charged to a dry heated precharged reaction zone, preferably under continuous agitation. If said compound is normally solid, it should be first heated above its melting point or, less preferably, dissolved or dispersed in an inert organic diluent such as mentioned above. The reactants enter at the inlet portion, continuously flow under anhydrous conditions preferably into a reaction zone which has been at least partially prefilled with the desired steady state and product composition. As the anionically surface active product is formed, it can be continuously withdrawn from the outlet portion of the reactor at a rate equal to the combined charging rate of the reactants, thereby maintain a constant inventory within the reactor. The reactants are introduced at a predetermined constant molar ratio and constant charging rate for each reactant. Reactors containing zones wherein the temperature can be raised or lowered are well known in the art, a typical one being a jacketed sump phase reactor. The technique of precharging a continuous reaction apparatus with end product during startup to achieve a steady state operation is well known to the art. Thus, in order to maintain almost the same volume of material in the reactor at all times, as the two reactants are added at the inlet zone at a constant and desired molar ratio, a product stream of finished phosphate ester mixture is discharged at a rate preferably equal to the combined feed rate of the reactants. Such a system has been found to promote product uniformity.

In the prior art batch technique, $P_2O_5$ is added gradually to the organic hydroxyl compound at a specified temperature until the desired molar ratio is reached, followed by an elevation of temperature until the reaction is completed, usually 1 to 5 hours. The process of the present invention, however, requires no change of temperature during processing. This is seen as an important savings of power and perhaps labor as well.

The batch technique which is exothermic may in some cases require cooling to prevent the temperature from going above about 110° C. since temperatures above about this tend to produce discolored and darkened products. The instant process however can be carried out anywhere between ambient temperature and 130° C. without detrimental effects.

In a preferred mode, the organic hydroxyl compound is introduced into the inlet zone at a rate of from about 0.005 to about 0.2 mole per minute, while the $P_2O_5$ is introduced at a rate of from about 0.007 to about 0.3 mole per minute. In this manner, the reaction proceeds with about 1 to about 4 moles of $P_2O_5$ being reacted with about 1 to about 4 moles of organic hydroxyl compound. End product can be withdrawn from the outlet end at various rates between about 0.005 and 0.2 mole per minute with no apparent change in product composition.

It has been found beneficial to admix a small amount of hydrophosphorous or phosphorous acid with the organic hydroxyl compound prior to reaction with the $P_2O_5$. Generally about 0.01% up to about 5% based on the weight of organic hydroxyl compound is employed. Thus aqueous solutions of the acid in concentrations available in the market place can be utilized. The presence of the acid serves as a color inhibitor.

When the reaction is conducted under anhydrous conditions, the product comprises a mixture of the primary and secondary phosphate esters of the organic hydroxyl compound employed, in combination with, in some instances, a small amount of unreacted compound and the acid component.

The degree of esterification in the product may be determined by potentiometric titration or by titration with alkali to methyl orange and then to phenolphthalein.

Isolation of the product mixture may be accomplished by any of the known separation and purification techniques.

The color of products prepared in this manner is at least equal to and most often superior to the color obtained by prior batch techniques.

The following non-limiting examples illustrate the process of the instant invention. Unless otherwise specified, all percentages and parts are by weight.

EXAMPLE 1

A sump reactor modified for continuous processing and jacketed for heating and cooling to maintain constant temperature was charged with 660 parts of the phosphate ester mixture of nonyl phenol which had been ethoxylated with 9 moles of ethylene oxide. A mixture of 600 parts (0.98 mole) of 9 mole ethoxylated nonyl phenol and 1.3 parts of 50% active hypophosphorus acid was introduced into the heated sump reactor at a rate of 30 parts per minute. Simultaneously, $P_2O_5$ in the amount of 59 parts (0.415 mole) was added at a rate of 3 parts per minute over 19 minutes and allowed to react with the nonyl phenol ethoxylate.

The reaction mixture was kept under a nitrogen blanket at 70–75° C. through the addition period and substantially anhydrous conditions prevailed in the reactor.

From the outlet portion of the reactor, six (6) samples were taken of the emerging end product mixture. The rate of discharge varied from 16 to 67 parts of end product per minute with substantially no change in product composition. The end product was found on analysis to contain unreacted nonyl phenol, phosphated monoester, phosphated diester and phosphoric acid. The following product cuts were obtained:

| | | | Percent | | | |
|---|---|---|---|---|---|---|
| Sample number | Weight in grams | Discharge rate in parts per minute | Nonyl phenol ethoxylate | Monoester, M.W. 690 | Diester, M.W. 1,286 | $H_3PO_4$ |
| 1 | 157 | 31 | 4.2 | 37.1 | 79.3 | 0.76 |
| 2 | 160 | 53 | 5.0 | 35.7 | 83.2 | 0.71 |
| 3 | 161 | 46 | 2.7 | 35.9 | 79.4 | 0.80 |
| 4 | 176 | 43 | 2.1 | 36.9 | 78.2 | 0.72 |
| 5 | 168 | 67 | 4.5 | 35.6 | 81.7 | 0.76 |
| 6 | 048 | 16 | 6.8 | 36.4 | 76.0 | 0.79 |

EXAMPLES 2 AND 3

To the heel, i.e., that portion remaining in the reactor after the removal of the six (6) cuts of Example 1, was continuously added 600 parts of nonyl phenol which had been ethoxylated with 9 moles of ethylene oxide, and 1.3 parts of 50% hypophosphorous acid, over a period of 18 minutes such that the addition rate was about 3⅓ parts per minute each minute. Fifty-nine (59) parts of phosphorous pentoxide was added simultaneously at a rate of three (3) parts per minute. The same conditions prevailed as in Example 1 except that the temperature was maintained in the range of 81°–84° C. during the reaction.

After securing five (5) product cuts, 600 additional parts of the organic hydroxyl compound pre-mixed with an additional 1.3 parts of the acid were added at a constant rate over a 62 minute period at the higher temperature of 90–95° C. Fifty-nine (59) parts of $P_2O_5$ were introduced simultaneously at a rate of slightly less than one part per minute. The ethylene oxide used to alkoxylate the nonyl phenol as used in Example 3 was found to contain 0.5% water. No other moisture was present however. Five (5) end product cuts were made.

The following table recites the analyses of the several cuts of each of these examples.

It is seen that the calculated percentage present of the several components comprising the mass being discharged from the reactor totals greaters than 100%. It is known to the art that due to the method of titration analysis utilized, data of this nature is generated and such numerical calculations are deemed acceptable.

It is also to be noted that whereas the added acid component of the examples was hypophosphorous, the analysis indicates the presence of phosphoric acid. This is caused by hydrolysis of a small amount of the $P_2O_5$ from moisture picked up during the $P_2O_5$ charging operation or trace water in the hydroxylic organic compound.

One of the advantages asserted for this continuous process over prior art batch techniques is the promotion of end product uniformity.

| | | | | Percent | | | |
|---|---|---|---|---|---|---|---|
| Example number | Sample | Weight in grams of end product | Discharge rate per minute | Nonionic not reacted | Mono-ester, M.W. 690 | Di-ester, M.W. 1,286 | $H_3PO_4$ M.W. 98 |
| 2 | 1 | 154 | 31 | 3.0 | 38.1 | 83.8 | 0.3 |
| 2 | 2 | 169 | 42 | 2.7 | 39.8 | 71.8 | 0.35 |
| 2 | 3 | 173 | 42 | 2.1 | 38.4 | 73.8 | 0.5 |
| 2 | 4 | 175 | 44 | 1.7 | 39.4 | 77.0 | 0.45 |
| 2 | 5 | 0.37 | 37 | 2.6 | 41.1 | 75.5 | 0.54 |
| 3 | 1 | 158 | 12.5 | 1.7 | 54.9 | 47.2 | 1.2 |
| 3 | 2 | 156 | 12.5 | 2.4 | 53.7 | 43.6 | 1.2 |
| 3 | 3 | 200 | 14 | 1.0 | 53.7 | 46.5 | 1.4 |
| 3 | 4 | 178 | 16 | 0.6 | 52.6 | 50.6 | 1.6 |
| 3 | 5 | 194 | 16 | 4.2 | 50.0 | 44.6 | 1.2 |

This pair of examples illustrates the effect upon the ratio of monoester to diester caused by the presence of a small amount of water affiliated with the organic hydroxyl compound. In certain instances this may not be considered undesirable.

EXAMPLE 4

A reactor of the nature previously described in Example 1 was heated to 60–65° C. 636 parts of a phosphate ester mixture comprising a mixture of 8 and 10 carbon atom straight chain alcohols which had been ethoxylated with 4 moles of ethylene oxide was charged to the reactor. The alcohol mixture is available under the name Alfol 810 from Conoco. To this was added over a 27 minute period, at a substantially constant rate, 543 parts of the same unphosphated organic hydroxyl compound and 7.5 parts of hypophosphorus acid. $P_2O_5$ was simultaneously added over this time period at 3.3 p.p.m. Five (5) samples were taken of the product being continuously discharged at rates of between 25 and 32 r.p.m., and the samples varied in weight from 130–168 grams each. Analysis indicated that the monoester of molecular weight 401 and the diester of molecular weight 704 varied in percent per sample of from 45.0 to 46.2 for monoester and 52.1 to 53.2 for diester.

EXAMPLE 5

In a similar heated apparatus charged with 505 parts phosphate ester mixture of six (6) mole ethoxylated tridecyl alcohol, was added 450 parts of the same unphosphated organic hydroxyl compound, and 51 parts of $P_2O_5$ continuously and simultaneously for 25 minutes, while the heat was maintained at 85°–95° C.

Five samples varying in weight from 100 to 110 grams were gathered at discharge rates that varied between 20 and 22 parts per minute. The analysis indicated that the phosphate monoester of molecular weight 544 and diester of molecular weight 990 were present in the ratio of 38.1% to 39.5% of the former to 63.8% to 65.1% of the latter respectively.

The fourth and fifth examples serve to further illustrate the formation of a product mixture exhibiting a substantially uniform ratio of mono to diester from random sample to random sample during the operation of the continuous process of this invention.

To illustrate the point, the reactants of Example 1 were utilized in similar proportions as in that example, but in a batch process. This batch operation was carried out six (6) times and the results analyzed.

Thus, fifty-nine (59) parts of $P_2O_5$ were slowly added to a heated (50–60° C.) stirred reactor containing 600 parts of 9 mole ethoxylated nonyl phenol and 1.3 parts of 50% hypophosphorous acid over a thirty minute period. The reactants were allowed to exotherm to 70–75° C. and the products were collected for analyses.

The phosphated monoester and the phosphated diester were found to be present in the amounts shown in the following table for each batch prepared:

| | Percent | | | |
|---|---|---|---|---|
| Batch number | Non-ionic | Mono-ester molecular wt. 690 | Di-ester, M.W. 1,286 | $H_3PO_4$ |
| 1B | 4.2 | 37.8 | 78.4 | 0.6 |
| 2B | 1.4 | 44.7 | 48.1 | 0.9 |
| 3B | 2.2 | 32.6 | 65.7 | 1.0 |
| 4B | 1.4 | 44.9 | 45.8 | 0.8 |
| 5B | 2.6 | 36.6 | 67.4 | 0.2 |
| 6B | 1.5 | 41.5 | 57.9 | 0.2 |

In summary, the process of this invention can be run continuously for prolonged periods of time with uniform results and with a minimum of supervision. Thus, once the addition rate for optimum conversion has been established, the reactants can be fed into the reaction zone at a predetermined rate and product withdrawn continuously without necessitating any further manipulative steps.

The products prepared by this process exhibit surface active, foaming, emulsifying, wetting and detergent properties largely dependent upon and similar to those of the non-ionic surface active agent utilized in the process. Their physical appearance is also related to that of the unphosphated materials. The ester mixture prepared herein can be formulated with the usual suspending agents, brighteners, stabilizers, enzymes and the like as is known in the art for the particular use contemplated.

Since certain changes may be made in the above process without departing from the scope of the invention herein involved, it is intended that all matter contained in the above description shall be interpreted as illustrative and not in a limiting sense.

What is claimed is:

1. An improved process for the simultaneous production of primary and secondary phosphate esters, said process consisting essentially of:

(a) continuously charging a phosphating agent consisting of non-gaseous $P_2O_5$ in anhydrous, solid form directly or dispersed in an inert organic liquid diluent at a substantially uniform predetermined rate to a reaction zone maintained under substantially anhydrous conditions at a substantially constant temperature within the range of from about ambient temperature to about 130° C.;

(b) simultaneously and continuously charging an organic hydroxyl compound to said reaction zone at a substantially uniform rate, said compound having at least one hydroxyl group capable of reacting with said $P_2O_5$ to form a phosphate ester, the mole ratio of said organic hydroxyl compound to said $P_2O_5$ charged being maintained substantially uniform, said organic hydroxyl compound being charged at a substantially uniform rate within the range of from about 0.005 to about 0.2 mole per given unit of time, said $P_2O_5$ being charged at a substantially uniform rate within the range of from about 0.007 to about 0.3 mole per said given unit of time, with from about 1 to about 4 moles of $P_2O_5$ thereby reacting with from about 1 to about 4 moles of said organic hydroxyl compound, thus producing primary and secondary phosphate esters simultaneously as a product mixture having a substantially constant molar ratio of said primary phosphate ester to said secondary phosphate ester; and (c) continuously withdrawing said primary and secondary phosphate esters from said reaction zone as said product mixture at a substantially uniform rate of from about 0.005 to about 0.2 mole per said given unit of time, said product mixture having a substantially constant molar ratio of primary phosphate ester to secondary phosphate ester and thus all advantageous product uniformity on a continuous operating basis.

2. The process of claim 1 wherein hypophosphorous or phosphoric acid is premixed with the organic hydroxyl compound in the amount of from 0.01% up to about 5% by weight based on the weight of organic hydroxyl compound.

3. The process of calim 1 wherein the organic hydroxyl compound is continuously charged to the reaction zone at the rate of from about 0.005 to about 0.2 mole/minute.

4. The process of claim 3 wherein the $P_2O_5$ is continuously charged to the reaction zone at the rate of from about 0.007 to about 0.3 mole/minute.

5. The process of claim 4 wherein the $P_2O_5$ is in particulate form.

6. The process of claim 4 wherein the $P_2O_5$ is dispersed in an inert organic solvent.

7. The process of claim 1 wherein continuous agitation is maintained within the reaction zone.

References Cited

UNITED STATES PATENTS

| | | | |
|---|---|---|---|
| 3,629,377 | 12/1971 | Schenck et al. | 260—980 |
| 3,597,511 | 8/1971 | Olson et al. | 260—980 |
| 3,333,029 | 7/1967 | Muller-Schiedmayer et al. | 260—980 |
| 3,004,057 | 10/1961 | Nunn, Jr. | 260—980 |
| 3,004,056 | 10/1961 | Nunn, Jr. et al. | 260—980 |

FOREIGN PATENTS

| | | | |
|---|---|---|---|
| 1,027,425 | 4/1966 | Great Britain | 260—980 |
| 1,052,198 | 12/1966 | Great Britain | 260—980 |

JOSEPH P. BRUST, Primary Examiner

U.S. Cl. X.R.

260—97.5, 403